US012099769B2

(12) United States Patent
Yang et al.

(10) Patent No.: US 12,099,769 B2
(45) Date of Patent: Sep. 24, 2024

(54) METHOD, APPARATUS, DEVICE AND STORAGE MEDIUM FOR INFORMATION DISPLAY

(71) Applicant: Lemon Inc., Grand Cayman (KY)

(72) Inventors: Mingyu Yang, Beijing (CN); Yue Chen, Beijing (CN)

(73) Assignee: LEMON INC., Grand Cayman (KY)

(*) Notice: Subject to any disclaimer, the term of this patent is extended or adjusted under 35 U.S.C. 154(b) by 0 days.

(21) Appl. No.: 18/195,818

(22) Filed: May 10, 2023

(65) Prior Publication Data

US 2024/0168689 A1 May 23, 2024

(30) Foreign Application Priority Data

Nov. 22, 2022 (CN) .......................... 202211468924.5

(51) Int. Cl.
| | |
|---|---|
| G06F 3/14 | (2006.01) |
| G06F 3/04817 | (2022.01) |
| G06F 3/0485 | (2022.01) |
| G06Q 50/00 | (2024.01) |
| G06T 5/70 | (2024.01) |
| G06V 10/74 | (2022.01) |

(52) U.S. Cl.
CPC ............ G06F 3/14 (2013.01); G06F 3/04817 (2013.01); G06F 3/0485 (2013.01); G06Q 50/01 (2013.01); G06T 5/70 (2024.01); G06V 10/761 (2022.01)

(58) Field of Classification Search
CPC ...... G06F 3/14; G06F 3/04817; G06F 3/0485; G06V 10/761; G06Q 50/01; G06T 5/002
See application file for complete search history.

(56) References Cited

U.S. PATENT DOCUMENTS

| | | | | |
|---|---|---|---|---|
| 10,044,501 | B1* | 8/2018 | Bradley | ............. H04L 63/0492 |
| 10,165,022 | B1* | 12/2018 | Hubbard | ............... G06F 3/1454 |
| 11,282,174 | B1* | 3/2022 | DeMaio | ................... G06T 5/70 |
| 11,503,125 | B2* | 11/2022 | Nassirzadeh | .......... G06Q 50/01 |

(Continued)

FOREIGN PATENT DOCUMENTS

| | | |
|---|---|---|
| CN | 108255923 A | 7/2018 |
| CN | 114205635 A | 3/2022 |

OTHER PUBLICATIONS

International Search Report for PCT/SG2023/050773, mailed Apr. 3, 2024, 19 pages.

*Primary Examiner* — Ariel A Balaoing
(74) *Attorney, Agent, or Firm* — Astute IP Law Group

(57) ABSTRACT

According to embodiments of the present disclosure, a method, apparatus, device and storage medium for information display are provided. The method comprises in response to a target multimedia content to be presented to a first user, determining whether the first user has a permission to view a clear version of the target multimedia content. If it is determined that the first user has no permission to view the clear version of the target multimedia content, displaying a blurred version of the target multimedia content; and displaying an interactive information item associated with the target multimedia content in a clear mode. In this way, the interactive information items associated with the multimedia content can be displayed while the blurred version of the multimedia content is displayed, so as to provide more rich and interesting information display.

12 Claims, 11 Drawing Sheets

(56) References Cited

U.S. PATENT DOCUMENTS

| | | | |
|---|---|---|---|
| 2011/0292283 A1* | 12/2011 | Stephens | H04N 21/4312 715/753 |
| 2013/0286223 A1* | 10/2013 | Latta | H04N 1/00151 348/207.1 |
| 2013/0326355 A1* | 12/2013 | Pak | G06Q 30/0241 715/733 |
| 2014/0184743 A1* | 7/2014 | Chen | H04N 13/161 348/43 |
| 2015/0172238 A1* | 6/2015 | Ahmed | H04N 21/4223 709/217 |
| 2015/0242638 A1* | 8/2015 | Bitran | G06F 21/6245 726/26 |
| 2016/0148016 A1* | 5/2016 | Rylski | G06F 21/6245 348/143 |
| 2016/0255091 A1* | 9/2016 | Evans | G06Q 50/01 726/4 |
| 2016/0260201 A1 | 9/2016 | Liu | |
| 2017/0060388 A1* | 3/2017 | Einaudi | G06F 3/04817 |
| 2017/0337652 A1* | 11/2017 | Sarin | H04N 1/4493 |
| 2018/0191792 A1 | 7/2018 | Paul | |
| 2018/0332347 A1* | 11/2018 | Hamiti | G06F 16/435 |
| 2019/0306573 A1 | 10/2019 | Xiong et al. | |
| 2020/0159963 A1 | 5/2020 | Giuseppe et al. | |
| 2021/0200426 A1* | 7/2021 | Al Majid | G06F 3/0482 |
| 2022/0005129 A1* | 1/2022 | Snell | G06F 16/48 |
| 2022/0360841 A1 | 11/2022 | Tian et al. | |
| 2023/0118533 A1* | 4/2023 | Benchetrit | G06Q 50/01 705/319 |
| 2023/0153473 A1* | 5/2023 | Dahan | G06F 21/6245 726/26 |

\* cited by examiner

METHOD, APPARATUS, DEVICE AND STORAGE MEDIUM FOR INFORMATION DISPLAY

CROSS-REFERENCE TO RELATED APPLICATION(S)

This application claims priority to and benefits of Chinese Patent Application No. 202211468924.5, filed on Nov. 22, 2022, and entitled "METHOD, APPARATUS, DEVICE AND STORAGE MEDIUM FOR INFORMATION DISPLAY", the entire disclosure of which is hereby incorporated by reference.

TECHNICAL FIELD

Example embodiments of the present disclosure generally relate to the computer field, and specifically, to a method, apparatus, device and computer-readable storage medium for information display.

BACKGROUND

More applications are currently designed to provide various services to users. Users may use such content sharing applications to view, comment and repost various content such as multimedia content including videos, pictures, picture collections, sound, and so on. Content sharing applications further allow users to create and post multimedia content like pictures or videos. Application providers expect to show users more rich and interesting content or information. In this way, the platform can not only provide a richer variety of information display, but also increase the user stickiness to the applications.

SUMMARY

In the first aspect of the present disclosure, a method for information display is provided. The method comprises in response to a target multimedia content to be presented to a first user, determining whether the first user has a permission to view a clear version of the target multimedia content. If it is determined that the first user has no permission to view the clear version of the target multimedia content, displaying a blurred version of the target multimedia content; and displaying an interactive information item associated with the target multimedia content in a clear mode.

In a second aspect of the present disclosure, a method for information display is provided. The method comprises in response to receiving a switch operation for switching a first multimedia content currently presented in a user interface to a second multimedia content, performing the switching by reducing a first part of the first multimedia content displayed in the user interface and increasing a second part of the second multimedia content displayed in the user interface. The method further comprises in response to no longer detecting the switch operation, determining a primary multimedia content from the first and second multimedia contents based at least on the first and second parts. The method further comprises displaying a plurality of interactive information items associated with the determined primary multimedia content in a dynamic mode. The first and second multimedia contents are clear or blurred.

In a third aspect of the present disclosure, an apparatus for information display is provided. The apparatus comprises a permission determination module, configured to in response to a target multimedia content to be presented to a first user, determine whether the first user has a permission to view a clear version of the target multimedia content. The apparatus further comprises a blurred content display module, configured to in response to a determination that the first user has no permission to view the clear version of the target multimedia content, display a blurred version of the target multimedia content; and an interactive information item display module configured to display an interactive information item associated with the target multimedia content in a clear mode.

In a fourth aspect of the present disclosure, an apparatus for information display is provided. The apparatus comprises a content switching module, configured to in response to receiving a switch operation for switching a first multimedia content currently presented in a user interface to a second multimedia content, perform the switching by reducing a first part of the first multimedia content displayed in the user interface and increasing a second part of the second multimedia content displayed in the user interface. The apparatus further comprises a primary content determination module, configured to in response to no longer detecting the switch operation, determine a primary multimedia content from the first and second multimedia contents at least based on the first and second parts. The apparatus further comprises an interactive information item display module configured to display a plurality of interactive information items associated with the determined primary multimedia content in a dynamic mode. The first and second multimedia contents are clear contents or blurred contents.

In a fifth aspect of the present disclosure, an electronic device is provided. The device comprises at least one processing unit; and at least one memory, coupled to the at least one processing unit and storing instructions to be executed by the at least one processing unit. The instructions, when executed by the at least one processing unit, cause the device to perform a method according to the first or second aspect.

In a sixth aspect of the present disclosure, a computer-readable storage medium is provided. A computer program is stored on the medium, which, when executed by a processor, implements a method according to the first or second aspect.

It is to be understood that the Summary is neither intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
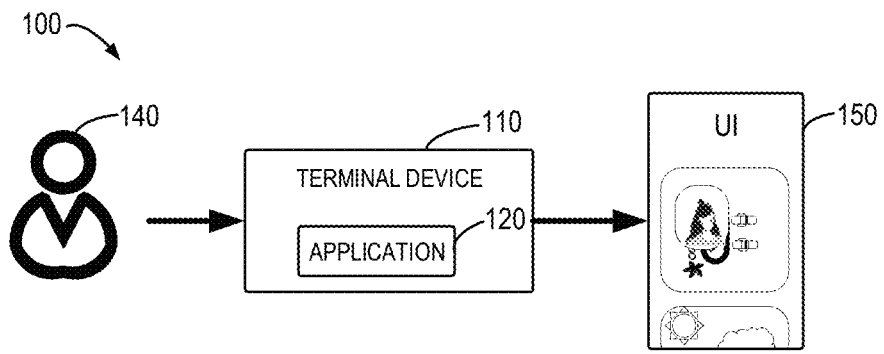
FIG. 1 illustrates a schematic view of an example environment in which embodiments of the present disclosure can be implemented.

Embodiments of the present disclosure will be described in more detail with reference to the accompanying drawings, in which some embodiments of the present disclosure have been illustrated. However, it is to be understood that the present disclosure can be implemented in various manners, and thus should not be construed to be limited to embodiments disclosed herein. On the contrary, those embodiments are provided for the thorough and complete understanding of the present disclosure. It is to be understood that the drawings and embodiments of the present disclosure are merely for the purpose of illustration, rather than limiting the protection scope of the present disclosure.

In the description of embodiments of the present disclosure, the term "includes" and its variants are to be read as open terms that mean "includes, but is not limited to." The term "based on" is to be read as "based at least in part on." The terms "one embodiment" or "a embodiment" are to be read as "at least one embodiment." The term "some embodiments" is to be read as "at least some embodiments." Other definitions, either explicit or implicit, may be included below.

As used herein, the term "in response to" refers to a state in which a corresponding event occurs or a state that is satisfied. It is to be understood that the execution time of subsequent actions executed in response to the event or condition may not be strongly related to the time when the event occurs or the condition is established. For example, in some cases, subsequent actions may be executed immediately when an event occurs or conditions are met. In other cases, subsequent actions may be executed after a period of time after the event occurs or conditions are met.

As used herein, "multimedia content" may be content in various forms, including images, videos, audios, pictures, picture collections, text, etc. As used herein, the term "image" may be used to refer to static image or static picture (i.e., photo), dynamic image or dynamic picture (e.g., video or animation). As used hereinafter, unless stated explicitly, the term "picture" refers to static picture. In some embodiments, the image may comprise audio information, or the like. The image may be a single image, or a composite image combined from a plurality of images.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various embodiments of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 illustrates a schematic view of an example environment 100 in which embodiments of the present disclosure can be implemented. In the example environment 100, an application 120 is installed in a terminal device 110. A user 140 may interact with the application 120 via the terminal device 110 and/or a device attached to the terminal device 110. The application 120 may be a content sharing application that can provide the user 140 with various services related to multimedia content, such as work browsing, commenting, reposting, creating (e.g., shooting and/or editing) and posting multimedia content.

In the environment 100 of FIG. 1, if the application 120 is in an active state, the terminal device 110 may present a page 150 of the application 120. The user interface 150 may be presented on a graphical user interface (GUI). The graphical user interface may be located on a display component of the terminal device 110, or on an external display component communicatively connected with the terminal device 110. Scope of this disclosure is not limited in this respect.

The user interface 150 may include various interfaces that the application 120 can provide, including but not limited to multimedia content presentation interface, content creation interface, content posting interface, message interface, personal interface, etc. In some embodiments, the user 140 may, for example, slide up and down to browse a plurality of contents in the multimedia content presentation interface. The application 120 may provide a content creation function to capture and/or create multimedia content, enabling the user 140 to edit captured or uploaded multimedia content, or the like. The application 120 may also have a posting function, allowing the user 140 to post the created multimedia content. It is to be understood that the content presented in the user interface 150 shown in FIG. 1 is only illustrated, but not limited. Various different contents may be presented in the user interface 150.

In some embodiments, the terminal device 110 communicates with a remote device such as a server (not shown) to provide services of the application 120. The terminal device 110 may be any type of mobile, fixed or portable terminal, including a mobile phone, a desktop computer, a laptop computer, a notebook computer, a netbook computer, a tablet computer, a media computer, a multimedia tablet, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. In some embodiments, the terminal device 110 can also support any type of interface (such as a "wearable" circuit, and the like) for the user 140. The remote device may be various types of computing system/server that can provide computing capability, including, without limitation to, a mainframe, an edge computing node, a computing device in a cloud environment, etc.

It is to be understood that the structures and functionalities of various elements in the environment 100 have been described only for the purpose of illustration, rather than limiting the scope of the present disclosure. In the environment 100, there may exist any number of terminal devices.

As described above, various content sharing applications are designed to provide users with various services. Some conventional content sharing applications can present multimedia contents shared by different users to a user. However, a user needs to click a comment option or like option to view interactive information such as comments or likes associated with multimedia content. In addition, in some conventional content sharing applications where a user needs to meet certain conditions to view clear multimedia content shared by other users, the user usually cannot view other users' comments, likes and other interactive information about the multimedia content. These conventional content sharing applications cannot provide users with better interaction or interaction awareness.

Embodiments of the present disclosure support the display of interactive information associated with multimedia content while browsing multimedia content. As will be described below, according to embodiments of the present disclosure, it is allowed to switch the presented multimedia contents in the user interface by changing sizes of parts in which different multimedia contents are displayed in the user interface. In addition, a primary multimedia content is determined according to the parts in which different multimedia contents are displayed in the user interface. A plurality of interactive information items associated with the primary multimedia content is displayed in a dynamic mode. In some embodiments, a plurality of interactive information items may include information such as comments, likes, etc. on the primary multimedia content. These comments, likes and other information may be played in a form of bullet screen bubbles.

In this way, users can view interactive information items associated with multimedia content while browsing different multimedia content. In addition, these interactive information items can be dynamically presented, such as in the form of bullet screen. In this way, users can be provided with a stronger sense of interaction, thereby improving their interactive experience.

Embodiments of the present disclosure also support clearly displaying interactive information items associated with multimedia content while displaying a blurred version of multimedia content. According to embodiment of the present disclosure, if the target multimedia content is to be presented to a first user, whether the first user has the permission to view a clear version of the target multimedia content is determined. If the first user has no permission to view the clear version of the target multimedia content, a blurred version of the target multimedia content is displayed. While the blurred version of the target multimedia content is displayed, the interactive information items associated with the target multimedia content are displayed in a clear mode.

In this way, users can view the interactive information items associated with the multimedia content even if they have no permission to see the clear version of the multimedia content. In addition, these interactive information items can be dynamically presented, such as in a form of bullet screen. In this way, users can be provided with a stronger sense of interaction, thereby improving their interactive experience.

Some example embodiments of the present disclosure will be described with reference to the drawings below.

Figure 2:
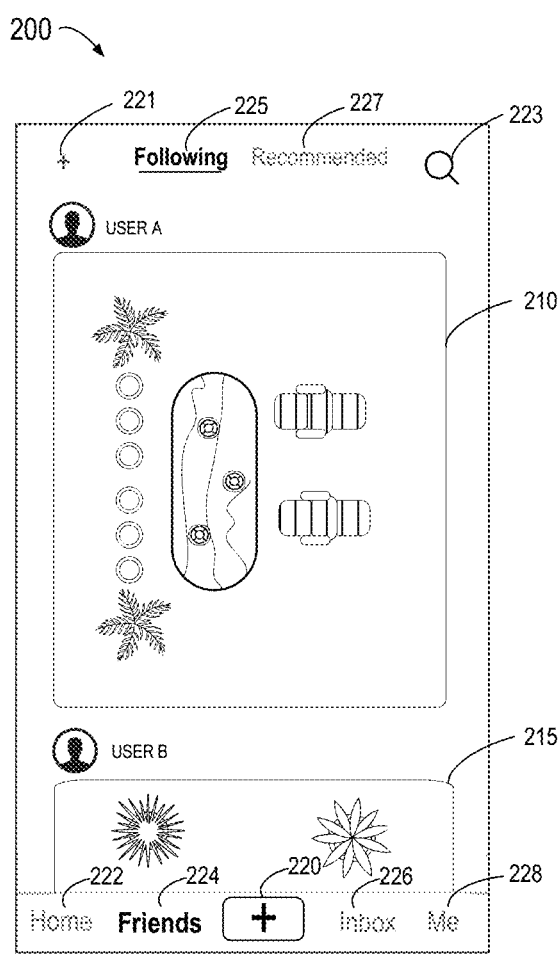
FIG. 2 illustrates a schematic diagram of an example user interface of an example application according to some embodiments of the present disclosure.

The information display approach according to the present disclosure can be applied to various content sharing applications. FIG. 2 illustrates an example user interface (referred to as interface 200 for short) of an example application 120 according to embodiments of the present disclosure. The interface 200 may be any interface of the application 120, such as the home page interface, friends interface, and so on. One or more multimedia contents, such as multimedia content 210 and multimedia content 215, may be presented in the interface 200.

A shooting start control for the interface 200 may be provided for starting a video shooting activity. Only as an example, the shooting start control may be the shooting start control 220 presented in the interface 200. For example, if the terminal device 110 detects a predetermined operation (e. g., click, touch, and so on) on the shooting start control 220, the terminal device 110 may activate the shooting mode to perform image shooting. The application 120 may provide various editing functions for the taken image content. The taken image may be posted or shared by the user 140 through the application 120. Other users may view the content shared by the user 140.

In addition to the shooting start control 220, the interface 200 also includes a navigation tab bar for navigating to different interfaces. A "lower navigation tab bar" in the lower part of the interface 200 includes navigation tabs 222, 224, 226 and 228. The navigation tab 222 has the characters "Home" indicating that the navigation tab corresponds to the home page of application 120; the navigation tab 224 has the characters "Friends" or "Now" indicating that the navigation tab corresponds to a content presentation interface (also referred to as an information display interface) of the application 120; the navigation tab 226 has the characters "Inbox" indicating that the navigation tab corresponds to the inbox interface (also referred to as the message interface) of the application 120; the navigation tab 228 has the character "Me" indicating that the navigation tab corresponds to the user's personal interface.

An "upper navigation tab bar" in the upper part of the interface 200 includes lower-level navigation tabs of the navigation tab 224, i.e., navigation tabs 225 and 227. The navigation tab 227 has the characters "Recommended" indicating a recommended content interface in which recommended content of the application 120 may be presented;

the navigation tab 225 has the characters "Following" indicating a following content interface in which content of following users may be presented. The interface 200 corresponds to the page of the navigation tab "Following" 225 under the navigation tab "Friends" 224, in which the following content, i.e., the multimedia content 210 and multimedia content 215 are presented.

In some embodiments, the interface 200 also includes an adding friend control 221 and a searching control 223. The user 140 may send a friend adding request to other users by clicking or selecting the adding friend control 221. The user 140 may search for a certain content or a certain user by clicking or selecting the searching control 223.

In some embodiments, if the application 120 is activated, an interface such as the interface 200 shown in FIG. 2 is entered. In the interface 200, the presentation of the information display interface may be activated by a predetermined operation. Examples of information display interfaces will be described with respect to FIGS. 4A to 4E and FIGS. 6A to 6E. Examples of predetermined operations for activating the information display interface include, but are not limited to, touching the navigation tab 224 or pressing the navigation tab 224 for more than a certain period of time, and the like. It is to be understood that, in addition to or alternatively to the predetermined operations listed above for activating the information display interface, the activation of the information display interface may be indicated in other ways. Examples of other methods include, but are not limited to, voice control instructions, triggering of hardware keys, specific gestures in a specific interface (for example, sliding gestures), and so on. The scope of this disclosure is not limited in this respect.

The above example describes the additional functions provided by the application 120. These functions are only illustrative, not restrictive. The application 120 may provide fewer functions or more abundant functions. These functions make the application 120 rich and interesting, thus improving user participation and experience.

It is to be understood that the example application 120 described in connection with FIG. 2 is only for the purpose of illustration. The content presentation approach described in the present disclosure can be applied to various applications, and the scope of the present disclosure is not limited in this regard.

It is to be understood that the interface 200 in FIG. 2 and each of the interfaces in the other drawings described below are only example interfaces, and various interface designs may exist in practice. Various graphical elements in an interface may have different arrangements and different visual representations, one or more of them may be omitted or replaced, and one or more other elements may also exist. The scope of this disclosure is not limited in this respect.

Figure 3:
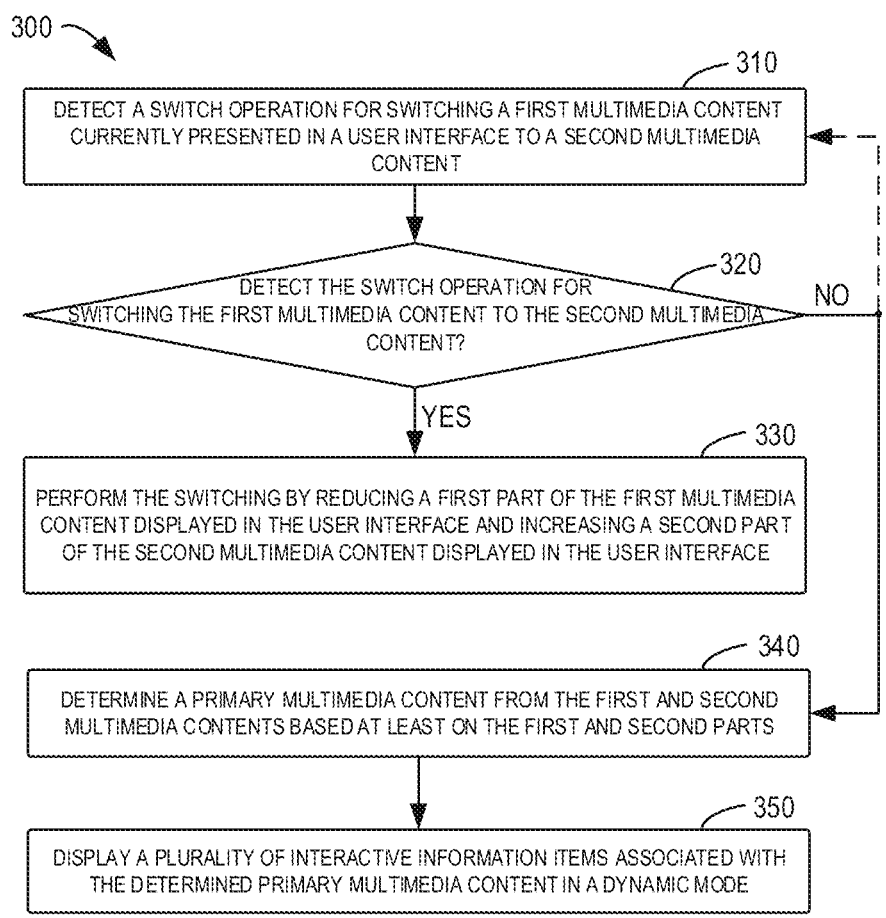
FIG. 3 illustrates a flowchart of a process for information display according to some embodiments of the present disclosure.

FIG. 3 illustrates a flowchart of a process 300 for information display according to some embodiments of the present disclosure. Process 300 may be implemented at the terminal device 110. For the purpose of discussion, the process 300 will be described with reference to environment 100 of FIG. 1. It is to be understood that process 300 may include additional actions not shown and/or may omit the actions shown, and the scope of the present disclosure is not limited in this regard.

At block 310, the terminal device 110 detects a switch operation for switching a first multimedia content currently presented in the user interface to a second multimedia content. As an example, the switch operation may include a sliding operation of the fingers of the user 140 in a first orientation (e, g., a portrait orientation). It is to be understood that, in addition to or as an alternative to the predetermined interaction operations listed above for switching the presentation content, switching of the presentation content may also be indicated in other ways. Examples of other methods include, but are not limited to, voice control instructions, triggering of hardware keys, specific gestures in a specific interface (for example, sliding gestures), and so on. The scope of this disclosure is not limited in this respect.

In some embodiments, the multimedia content may be any appropriate multimedia content, including but not limited to image, video, picture, picture set, sound and other content. In some embodiments, the multimedia content may be an image captured or acquired by a user using a device such as a camera. Multimedia content may also be a composite image combined from a plurality of images. Additionally, or alternatively, in some embodiments, multimedia content may also be a processed image obtained by editing an image or a composite image. For example, the multimedia content may be a blurred image or a composite image. The scope of this disclosure is not limited in this respect.

At block 320, the terminal device 110 determines whether the switch operation for switching the first multimedia content to the second multimedia content is detected. If the terminal device 110 does not detect the above switch operation at block 320, the terminal device 110 may continue detecting the switch operation at block 320. For example, if no content switch request is detected in such as an information display interface of the application 120, the presentation of the first multimedia content may be maintained, and the request continues to be detected periodically or in other ways. If other instructions are detected in this interface, corresponding operations may be performed according to other instructions.

If the terminal device 110 determines that the switch operation for switching the first multimedia content to the second multimedia content is detected at block 320, the terminal device 110 performs the switching at block 330 by reducing a first part of the first multimedia content displayed in the user interface and increasing a second part of the second multimedia content displayed in the user interface.

Figure 4A:
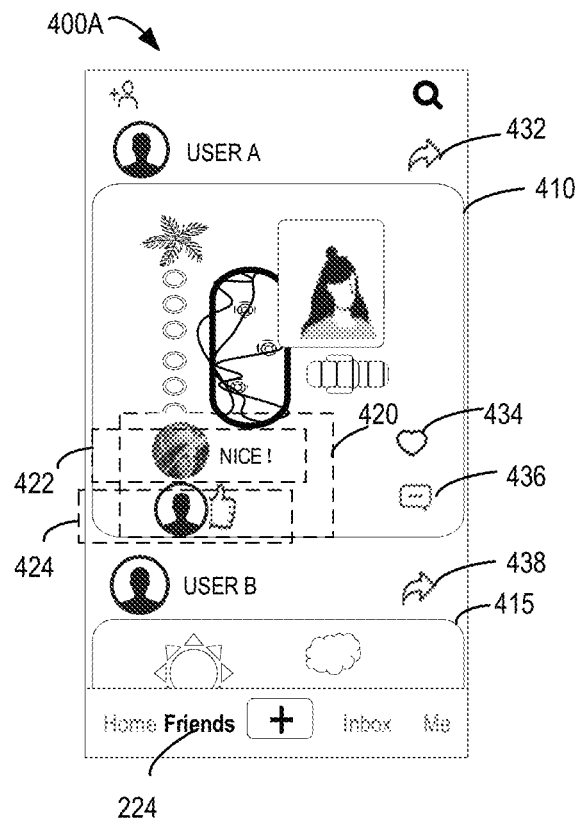
FIGS. 4A to 4E illustrate schematic diagrams of an example user interface for presenting multimedia content items and interactive information items according to some embodiments of the present disclosure.
Figure 4B:
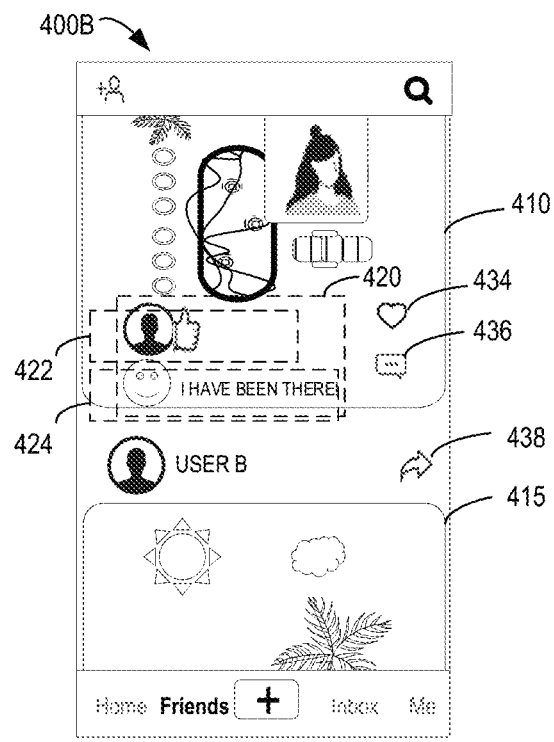
Figure 4C:
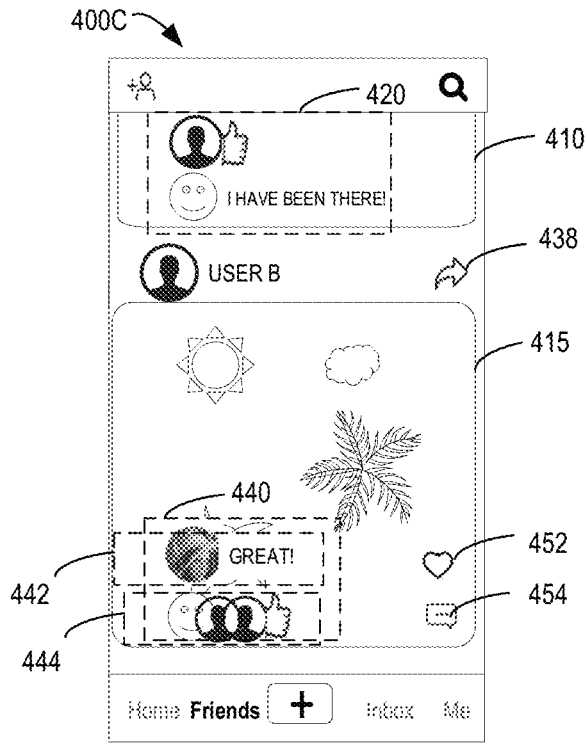

FIGS. 4A to 4C describe examples of multimedia content switching in a user interface according to an embodiment of the present disclosure. FIG. 4A shows an example information display interface 400A according to some embodiments of the present disclosure. The information display interface 400A may be the interface provided by the application 120, such as the interface under the navigation tab 224. The information display interface 400A presents a plurality of multimedia contents provided by different users, such as a multimedia content 410 provided by user A and a multimedia content 415 provided by user B. User A and user B may be users followed by a current user 140 of the application 120 in the application 120 or may be users recommended to the current user 140 by the application 120. It is to be understood that any number of multimedia contents may be presented in the information display interface 400A.

In some embodiments, the information display interface 400A also presents additional information associated with the multimedia contents 410 and 415. For example, the profile picture and/or user name of a user posting the multimedia content 410 may be presented. In some embodiments, time information related to the posting of multimedia content 410 may also be presented. The time information may be an accurate time when the multimedia content 410 is posted. The time information may also be a time interval between the time when the multimedia content 410 is posted and the time indicated by a system message prompting the content posting.

As used herein, the multimedia content 410 is referred to as the first multimedia content, and the displayed part thereof is referred to as the first part. The multimedia content 415 is referred to as the second multimedia content, and the displayed part thereof is referred to as the second part. In some embodiments, the multimedia content 410 and the multimedia content 415 are displayed in separate display windows of the information display interface 400A. It is to be understood that any number of multimedia content may be displayed in the information display interface 400A, and the scope of the disclosure is not limited in this regard.

In some embodiments, a group of multimedia contents presented in the information display interface 400A may be a group of multimedia contents of a predetermined type provided by a group of users of the application 120 within a predetermined period of time. One or more of the group of multimedia contents are presented in a predetermined arrangement orientation (e, g., a portrait orientation). One or more of the multimedia contents in this group may not be currently displayed. This group of multimedia content may be sorted according to any rule. For example, the multimedia content may be sorted according to the time of posting. For another example, a group of multimedia contents may also be sorted according to attributes of multimedia content, an intimacy degree between the user who posts the multimedia content and the current user, or the like. The multimedia content ranked first will be displayed as the primary multimedia content by default.

In the example of FIG. 4A, multimedia content 410 and multimedia content 415 are presented along a first arrangement orientation (also referred to as a first orientation). For example, in the example of FIG. 4A, the first arrangement orientation is a portrait orientation. However, in some other embodiments, the first arrangement orientation may also be other appropriate orientations. In the example where the multimedia content 410 and the multimedia content 415 are presented along the first arrangement orientation, the switch operation may be a user finger sliding along the first arrangement orientation.

In the example of FIG. 4A, if the terminal device 110 detects the user's finger sliding upward in the first orientation (for example, the portrait orientation), the information display interface 400A will be switched to the information display interface 400B of FIG. 4B. In the information display interface 400B, the first part displayed by the multimedia content 410 is reduced, while the second part displayed by the multimedia content 415 is increased.

If continuing detecting the user's finger sliding in the portrait orientation on the information display interface 400B, the information display interface 400B will become the information display interface 400C in FIG. 4C. In the information display interface 400C, the first part of the displayed multimedia content 410 is reduced, while the second part of the displayed multimedia content 415 is increased. It is to be understood that if the switch operation is continuously detected on the information display interface 400C, the presentation of multimedia content may continue to be switched according to the switch operation. For example, depending on the switch operation, more multimedia contents below the multimedia content 415 may be switched to, or the multimedia content 410 may be switched back.

Still refers to FIG. 3, at block 330, if the terminal device 110 determines that the switch operation is no longer detected, the terminal device 110 determines a primary multimedia content from the multimedia content 410 and the multimedia content 415 at block 340 based at least on the first and second parts.

In some embodiments, the terminal device 110 determines the primary multimedia content based on a size of the first part and/or a size of the second part. For example, the content corresponding to the part exceeding the threshold size in the first and second parts may be determined as the primary multimedia content. The threshold size may be preset.

Additionally, or alternatively, in some embodiments, the terminal device 110 determines the primary multimedia content based on a comparison between the first and/or second parts. For example, the multimedia content corresponding to a larger part may be determined as the primary multimedia content.

Additionally, or alternatively, in some embodiments, the terminal device 110 determines the primary multimedia content based on relative positions of areas for displaying the first and/or second multimedia contents in the user interface. For example, the multimedia content with the display area in a middle of the interface may be determined as the primary multimedia content. The methods for determining the primary multimedia content listed above may be used in combination. Other suitable methods may also be used to determine the primary multimedia content.

In the example of FIGS. 4A and 4B, multimedia content 410 is determined as primary multimedia content, while in FIG. 4C, multimedia content 415 is determined as primary multimedia content. If the switch instruction has not been detected, for a group of multimedia contents, a multimedia content ranking first will be displayed as the primary multimedia content by default.

Referring back to FIG. 3, at block 350, the terminal device 110 displays a plurality of interactive information items associated with the determined primary multimedia content in a dynamic mode. While the switch instruction has not been detected, the plurality of interactive information items associated with the default primary multimedia content will be automatically played while the information display interface 400A is displayed.

In some embodiments, the interactive information item may include textual content input by a user for multimedia content, such as comments. The interactive information item may also include evaluation information (for example, like) input by a user for the multimedia content. The interactive information item may also include other contents such as facial expressions, symbols, etc. or mixed contents. The interactive information item may also include information such as user's profile picture or user name of a user inputting the interactive information. It is to be understood that the various interactive information items listed used herein are only for the purpose of illustration, without suggesting any limitation. The interactive information item may include any appropriate content. The interactive information item may use any language, text, expression, symbol, etc. The scope of this disclosure is not limited in this respect.

In some embodiments, the terminal device 110 scrolls to display a plurality of interactive information items with at least one end aligned. For example, the plurality of interactive information items may be scrolled in a left aligned manner.

Taking FIG. 4A as an example, the terminal device 110 displays the plurality interactive information items 420 in a dynamic mode. In some embodiments, the terminal device 110 displays a plurality of information containers containing a plurality of interactive information items, such as information container 422, information container 424, and the like. The terminal device 110 may scroll to update contents of a plurality of information containers 422 and 424. For example, in the example of FIG. 4B, the contents of information containers 422 and 424 are updated. In this way, the plurality of interactive information items may be presented in a form of bubbles. It is to be understood that the shape, size and number of information containers may be arbitrary.

In some embodiments, the terminal device 110 presents the first interactive content item at a predetermined location for a predetermined period of time. If the predetermined time period expires, the terminal device 110 displays a different second interactive content item at a predetermined position for a predetermined time period. For example, the terminal device 110 may present the first interactive content item in the information container 422 to reach a predetermined time period, then update the content presented in the information container 422 to the second interactive content item, and display the second interactive content item for a predetermined time period. The predetermined time period may be preset or dynamically adjusted.

In this way, each interactive information item can be displayed for a predetermined period of time in the case of scrolling display of interactive information items. As a result, users can have enough time to view each interactive information item without missing information due to rapid scrolling of interactive information items.

In some embodiments, the terminal device 110 preferentially displays one or more interactive information items including textual content input by a user among a plurality of interactive information items. For example, an interactive information item comprising a content "Nice!" is displayed prior to an interactive information item with a content of a like icon. In some embodiments, the plurality of interactive information items may be displayed in a consolidated manner. For example, in FIG. 4C, a plurality of interactive information items representing likes may be combined and displayed as a single interactive information item 444.

In some embodiments, if the number of interactive information items associated with multimedia content is more than a threshold number, some of them may be selected for dynamically displaying. For example, a predetermined number of different types of interactive information items may be selected to scroll.

In some embodiments, for a secondary multimedia content among the multimedia content 410 and the secondary multimedia content 415 that is not determined as the primary multimedia content, the terminal device 110 presents a plurality of interactive information items associated with the secondary multimedia content in a static mode. For example, in the information display interface 400C, a plurality of interactive information items 420 associated with the multimedia content 410 is presented in a static mode. In this example, a plurality of interactive information items 440 associated with multimedia content 415 will be displayed in a dynamic mode.

In some embodiments, the terminal device 110 may also detect a second operation in a second orientation different from the first orientation for the primary multimedia content. For example, the terminal device 110 may detect a second operation in a landscape orientation for the multimedia content 410 in FIG. 4A. If the second operation is detected, the terminal device 110 displays a third multimedia content posted by an author who posts the primary multimedia content as a new primary multimedia content in the user interface. For example, the multimedia content 410 may be switched to another multimedia content posted by user A. In this way, not only different multimedia content posted by different users can be switched, but also different multimedia content posted by the same user can be switched.

In some embodiments, if the terminal device 110 receives the switch operation for switching the currently presented primary multimedia content to another multimedia content, it ceases displaying a plurality of interactive information items of the primary multimedia content in a dynamic mode. For example, in the process of switching from FIG. 4A to FIG. 4B, the display of the plurality of interactive information items 420 in a dynamic mode will be ceased. In other words, if a finger sliding is detected, the display of a plurality of interactive information items 420 in a dynamic mode will stop.

In some embodiments, if the terminal device 110 receives a predetermined operation for the primary multimedia content, it continues displaying a plurality of interactive information items in a dynamic mode. For example, if the terminal device 110 detects predetermined operations such as pausing playing, adjusting playing progress, repeating playing, muting playing, and the like on the multimedia content 410, it will continue displaying the plurality of interactive information items 420 in the dynamic mode. In other words, the dynamic display (e, g., scrolling display) of the plurality of interactive information items is independent of playback displaying of the multimedia content 410.

In some embodiments, if the terminal device 110 receives a predetermined user operation for an interactive information item associated with the first and/or second multimedia contents, the terminal device 110 presents an interface element or page for guiding the user to interact with the interactive information item.

Figure 4D:
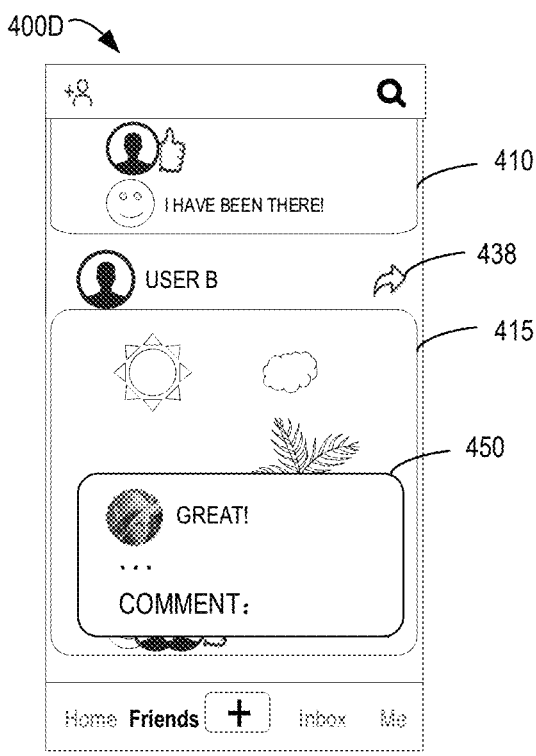
Figure 4E:
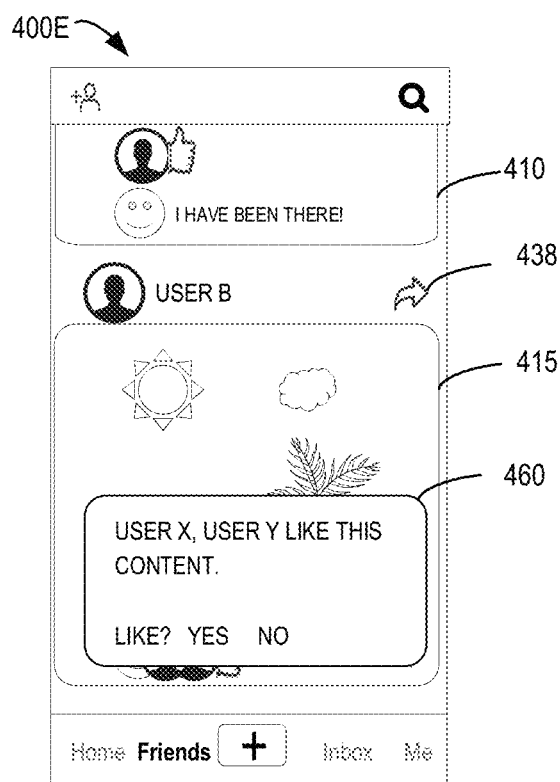

FIGS. 4D and 4E present examples of interface elements or pages that present interactions according to embodiments of the present disclosure. If, in the example of FIG. 4C, a predetermined user operation is detected on the interactive information item 442 including textual content among the plurality of interactive information items 440, a page 450 or interface element for guiding the user to view comments and/or add comments is presented in the information interaction interface 400D of FIG. 4D. For example, the page 450 may be presented in a form of a pop-up window or in a different transparency above the multimedia content 415.

If, in the example of FIG. 4C, a predetermined user operation is detected on the interactive information item 444 including evaluation content among a plurality of interactive information items 440, a page 460 or interface element for guiding the user to view and/or add a favorite is presented in the information display interface 400E of FIG. 4E. For example, a page 460 may be presented in a form of a pop-up window or in a different transparency above the multimedia content 415.

In addition, or alternatively, in some embodiments, the information display interfaces 400A to 400E also present graphical elements of like for multimedia contents, such as graphical elements 434 and 452. The graphic elements 434 and 452 may also show the number of times other users like the multimedia content (not shown). If predetermined operations (e, g., clicking, touching, selecting, etc.) on graphic elements 434 and 452 are detected, specific likes of multimedia content by other users may be presented for example in a pop-up window, or the page 460 may be presented.

In some embodiments, the information display interfaces 400A to 400E may also present graphical elements 436 and 454 for presenting comments on multimedia. The graphic elements 436 and 454 may also present the number of times other users have commented on multimedia content (not shown). If predetermined operations (e, g., clicking, touching, selecting, etc.) on graphic elements 436 and 454 are detected, specific comments on multimedia content by other users may be presented for example in a pop-up window, or the page 450 may be presented.

In some embodiments, the information display interfaces 400A to 400E may also present graphical elements for reposting multimedia content, such as a graphic element 432 for reposting multimedia content 410 and a graphic element 438 for reposting multimedia content 415. If a predetermined operation (for example, clicking, touching, selecting, etc.) on the graphic element 432 or 438 is detected, a content reposting interface may be switched, or a content reposting window may be popped up in the current interface. The user 140 may repost links of corresponding multimedia content to other users in the content reposting interface or content reposting window.

In addition, or alternatively, in some embodiments, the information display interfaces 400A to 400E may also provide more controls or functions. These controls or functions can be hidden, and the hidden controls or functions can be expanded by a certain position in the information display interface 400A to 400E, such as a predetermined operation (for example, clicking). It is to be understood that the controls or functions shown here are only examples. Different numbers of controls and/or functions may be provided in the information display interfaces 400A to 400E. The scope of this disclosure is not limited in this regard.

By dynamically displaying the plurality of interactive information items associated with multimedia content while multimedia content is displayed, users can be provided with interactive perception. For example, the interaction received by the user is played in the form of bullet bubbles, to strengthen an atmosphere of interaction and improve the user's experience of interaction.

It is to be understood that the information display interfaces 400A to 400E in FIGS. 4A to 4E and the interfaces in other figures described below are only example interfaces, and various interface designs may exist in practice. Various graphical elements in an interface may have different arrangements and different visual representations, one or more of them may be omitted or replaced, and one or more other elements may also exist. The scope of this disclosure is not limited in this respect.

In the above examples of FIGS. 4A to 4E, multimedia content 410 and 415 are both clear. However, in some embodiments, a plurality of multimedia content presented may also be blurred. While these blurred multimedia contents are displayed, a plurality of interactive information items associated with the multimedia contents may still be displayed in a clear mode. Several examples of clearly presenting interactive information items while blurred multimedia content is displayed will be described below with respect to FIGS. 5 and 6A to 6E.

Figure 5:
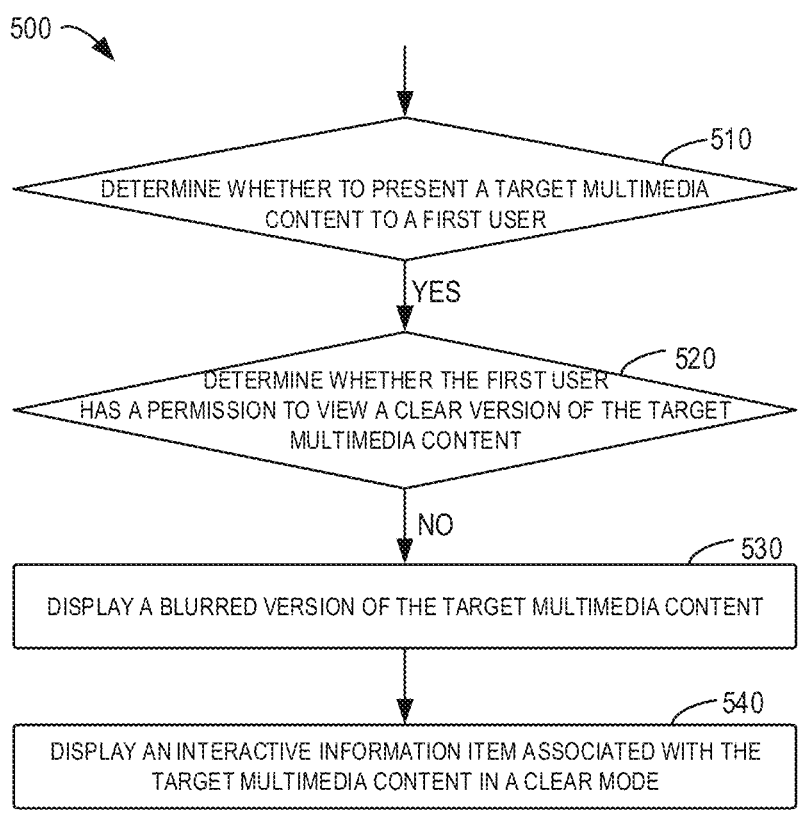
FIG. 5 illustrates a flowchart of another process for information display according to some embodiments of the present disclosure.

FIG. 5 shows a flowchart of a process 500 for information display according to some embodiments of the present disclosure. Process 500 may be implemented at terminal device 110. For discussion purposes, process 500 will be described with reference to environment 100 of FIG. 1. It is to be understood that process 500 may include additional actions not shown and/or may omit the actions shown, and the scope of the present disclosure is not limited in this regard.

At block 510, the terminal device 110 determines whether a target multimedia content is to be presented to a first user. The first user may be a current user of the application 120, such as the user 140. If the user 140 opens an application to view the target multimedia content posted by other users, the terminal device 110 determines that the target multimedia content will be presented to the user 140. The target multimedia content may be the content posted by other users of the application 120, such as user followed by the user 140 or users with social relationship with the user 140.

If at block 510, the terminal device 110 determines that the target multimedia content is to be presented to the first user, then at block 520, the terminal device 110 determines whether the first user has a permission to view a clear version of the target multimedia content.

In some embodiments, a group of users of application 120 post multimedia contents in response to a system message for posting a predetermined type of multimedia content within a predetermined period of time. The predetermined time period and the predetermined type may be arbitrarily set by a system and/or user. If the first user posts a multimedia content of the predetermined type within the predetermined period of time, the terminal device 110 determines that the first user has the permission to view a clear version of the target multimedia content. On the contrary, if the first user does not post a multimedia content of the predetermined type of within the predetermined period of time, the terminal device 110 determines that the first user has no permission to view the clear version of the target multimedia content.

In addition, or alternatively, in some embodiments, if a social relationship (for example, a friend relationship or a mutual following relationship) exists between the second user posting the target multimedia content and the first user, the terminal device 110 determines that the first user has the permission to view the clear version of the target multimedia content. On the contrary, the terminal device 110 determines that the first user has no permission to view the clear version of the target multimedia content.

In some embodiments, the terminal device 110 also determines whether the first user has the permission to view the clear version of the target multimedia content according to the settings applied to the target multimedia content by the second user posting the target multimedia content. As an example, the setting applied by the second user to the target multimedia content may be a user list of users capable to view a clear version of the target multimedia content.

In some embodiments, the terminal device 110 also determines whether the first user has the permission to view the clear version of the target multimedia content according to the account status of the first user in a social application (for example, the application 120). If the account status of the first user is abnormal, such as blocked, the first user has no permission to view the clear version of the target multimedia content.

It is to be understood that the example rules listed above for determining whether the first user has the permission to view a clear version of the target multimedia content are only for the purpose of illustration, without suggesting any limitation. The above rules may be used together or separately. Other appropriate rules may also be applied. The scope of this disclosure is not limited in this respect.

In some embodiments, if the terminal device 110 determines at block 520 that the first user has the permission to view a clear version of the target multimedia content, the terminal device 110 displays a clear target multimedia content. In addition, the terminal device 110 also displays interactive information items associated with the target multimedia content in a clear mode. For example, the terminal device 110 may display a user interface, such as an information display interface 400A, in which clear multimedia content 410 and clear multiple interactive information items 420 are displayed. A plurality of clearly displayed interactive information items 420 may be displayed in a dynamic manner. The various display modes of the interactive information item 420 are similar to those in FIGS. 4A to 4E, and will not be described again here.

In such a scenario, if the terminal device 110 detects a predetermined operation for an interactive information item associated with a clear version of the target multimedia content, the terminal device 110 presents an interface element or page for guiding the user to interact with the interactive information item. For example, an interactive interface or page may be similar to page 450 in FIG. 4D and page 460 in FIG. 4E.

If the terminal device 110 determines at block 520 that the first user has no permission to view the clear version of the target multimedia content, the terminal device 110 displays a blurred version of the target multimedia content at block 530. Any appropriate blurring, such as mosaic processing or any other appropriate blurring, may be applied to the target multimedia content to obtain the blurred version of the target multimedia content. In addition, the terminal device 110 displays an interactive information item associated with the target multimedia content in a clear mode at block 540.

Figure 6A:
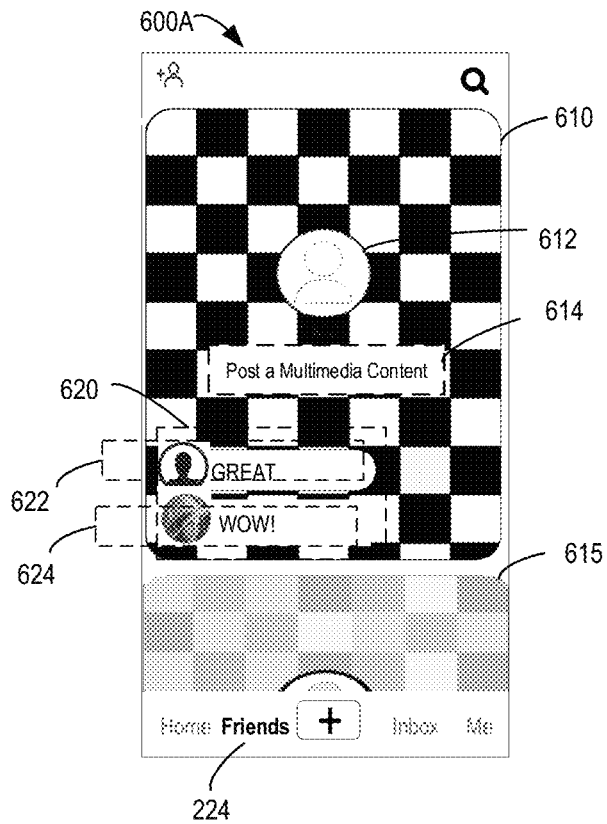
FIGS. 6A to 6E illustrate schematic diagrams of an example user interface that presents blurred multimedia contents and clear interactive information items according to some embodiments of the present disclosure.
Figure 6B:
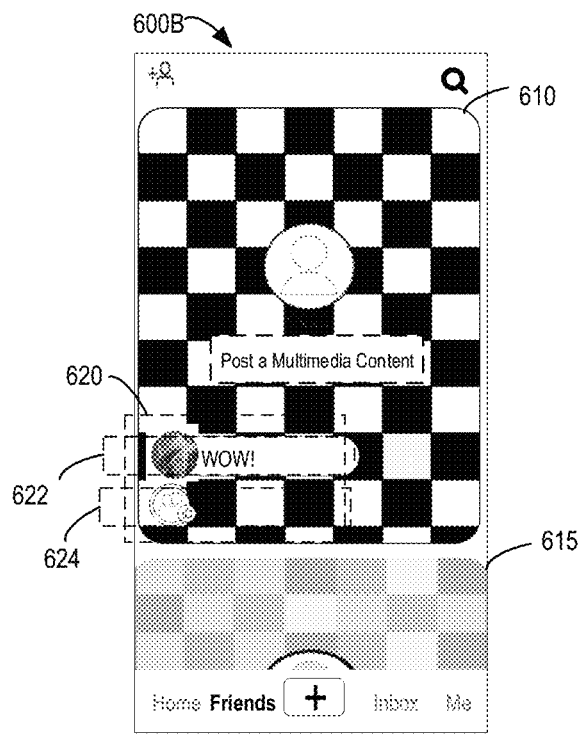
Figure 6C:
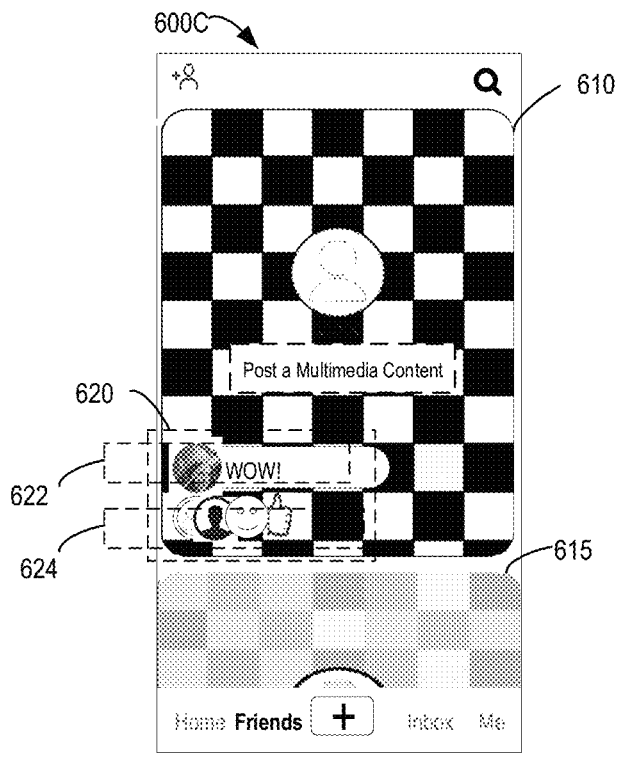
Figure 6D:
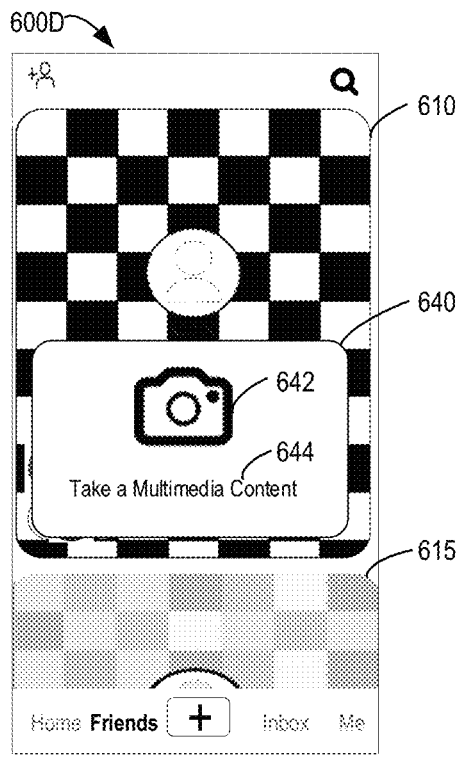
Figure 6E:
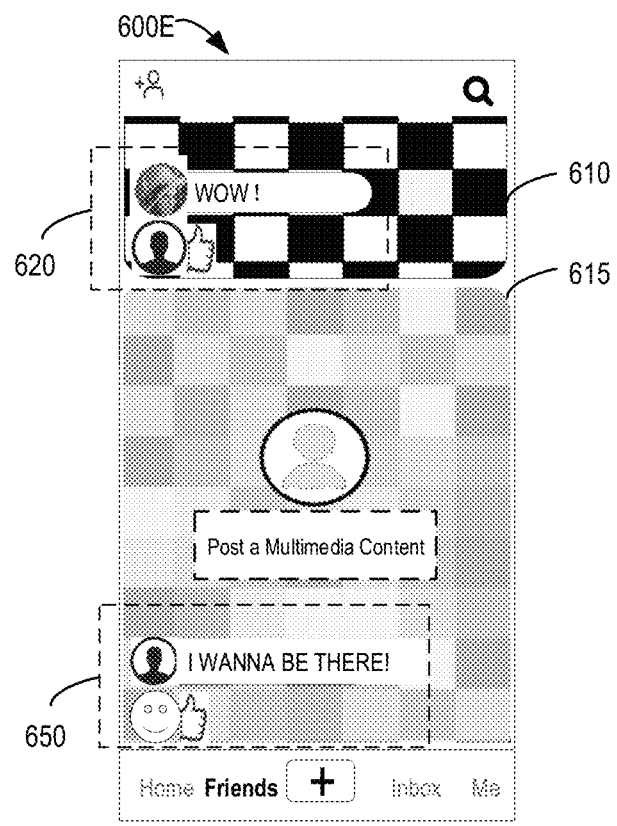

FIGS. 6A to 6E show schematic diagrams of an example user interface that presents blurred multimedia content and clear interactive information items according to some embodiments of the present disclosure. FIG. 6A shows an example information display interface 600A according to some embodiments of the present disclosure. The information display interface 600A may be the interface provided by the application 120, such as the interface under the navigation tab 224. The information display interface 600A presents blurred versions of a plurality of multimedia content provided by different users, such as a blurred version of multimedia content 610 and a blurred version of multimedia content 615. As used herein, it is to be understood that the information display interface 600A may present any number of blurred versions of multimedia contents.

In some embodiments, in the case of displaying the blurred version of multimedia content 610, the terminal device 110 also displays a profile picture 612 of a second user who posts the target multimedia content 610. The profile picture 612 may be a clear profile picture of the second user. In some embodiments, the profile picture 612 may also be a blurred profile picture of the second user.

In addition, or alternatively, in some embodiments, the terminal device 110 also displays prompt information, such as prompt information 614, for guiding the user to record and/or post multimedia content. It is to be understood that the textual prompt 614 listed herein are only for the purpose of illustration, without suggesting any limitation. The textual prompt 614 may use different textual contents, icons, labels, symbols, languages, etc.

In addition, or alternatively, in some embodiments, the terminal device 110 also displays interface elements for interacting with the target multimedia content. For example, the interactive interface elements may be similar to the graphic elements 434 and 436 in FIG. 4A, which will not be described in detail here.

In some embodiments, the terminal device 110 displays a plurality of clear versions of interactive information items associated with the multimedia content 610 in a dynamic mode. The interactive information item may include the textual content input by a user for the multimedia content, such as comments. The interactive information item may also include the evaluation information input by the user for the multimedia content, for example, like. The interactive information item may also include title information of the multimedia content. The interactive information item may also include other contents such as facial expressions, symbols, etc. or mixed contents. The interactive information item may also include information such as the user's profile picture or user name of the user who input the interactive information.

In some embodiments, the terminal device 110 scrolls to display a plurality of interactive information items with at least one end being aligned. For example, the plurality of interactive information items may be scrolled in a left aligned manner.

Taking FIG. 6A as an example, the terminal device 110 displays the plurality of interactive information items 620 in a dynamic mode. In some embodiments, the terminal device 110 displays a plurality of information containers containing a plurality of interactive information items, such as information container 622, information container 624, and the like. The terminal device 110 may scroll to update the contents of a plurality of information containers 622 and 624. For example, in the information display interface 600B of FIG. 6B, the contents of information containers 622 and 624 are updated. In this way, the plurality of interactive information items can be presented in the form of bubbles. It is to be understood that the shape, size and number of information containers may be arbitrary.

In some embodiments, the terminal device 110 presents the first interactive information item at a predetermined location for a predetermined period of time. If the predetermined time period expires, the terminal device 110 displays a different second interactive information item at a predetermined position for a predetermined time period. For example, the terminal device 110 may present the first interactive information item in the information container 622 to reach a predetermined time period, then update the content presented in the information container 622 to the second interactive information item, and display the second interactive content item for a predetermined time period. The predetermined time period may be preset or dynamically adjusted.

In this way, each interactive information item can be displayed for a predetermined period of time in the case of scrolling display of interactive information items. As a result, users can have enough time to view each interactive information item without missing information due to rapid scrolling of interactive information items.

In some embodiments, the terminal device 110 prioritizing displays one or more interactive information items including the textual content input by the user among a plurality of interactive information items. For example, the interactive information items including contents such as "great" and "wow!" are displayed prior to the interactive information item including contents of a like icon.

In some embodiments, the plurality of interactive information items may be displayed in a consolidated manner. For example, in the information display interface 600C of FIG. 6C, the plurality of interactive information items representing likes are combined and displayed in an information container 624. A predetermined graphical representation representing an interactive information item is displayed in the information container 624. The predetermined graphical representation may be an icon specific to a user who posts the corresponding interactive information item. In some embodiments, an indication (not shown) of the number of interactive information items may also be displayed in the information container 624. For example, the information container 624 may show how many users have liked the multimedia content 610.

In addition, or alternatively, in some embodiments, different kinds of interactive information items such as comments on multimedia content including textual content or other types of likes by one or more users may also be displayed in combination. A plurality of interactive information items may be combined and displayed in any way. The scope of this disclosure is not limited in this respect.

In some embodiments, if the terminal device 110 detects a predetermined operation for an interactive information item among a plurality of interactive information items 620 associated with the blurred version of multimedia content 610, it presents a user interface for guiding the user to record and/or post multimedia content. For example, a pop-up page 640 may be displayed in the information display interface 600D of FIG. 6D to guide users to record multimedia content. The pop-up page 640 may at least partially overlap on top of the blurred version of the multimedia content 610 with different transparency.

In some embodiments, the shooting control 640 is presented in the pop-up page 640. If the user 140 clicks or selects the shooting control 640, the multimedia content shooting mode is activated. In the multimedia content shooting mode, the information display interface 600D will be closed and the shooting interface will be displayed. By presenting the shooting control in the information display interface 600D with the pop-up page 640, the user 140 is provided with a convenient way to enter the shooting mode. In addition, or alternatively, in some embodiments, the pop-up page 640 also displays a textual prompt 644 to indicate the user to shoot multimedia content.

By performing a predetermined operation on the interactive information item to present a window that guides users to take or post content, users can be attracted to take and post content.

It is to be understood that in some embodiments, the process 500 described with reference to FIG. 5 may be executed in combination with the process 300 described with reference to FIG. 3 or separately. For example, the plurality of blurred versions of multimedia content may be switched between presentations according to the user's switch operation. In the information display interface 600E of FIG. 6E, in response to a switch operation, a display area of the blurred version of multimedia content 610 is reduced, while a display area of the blurred version of multimedia content 615 is increased. In this scenario, the plurality of interactive information items 620 will be displayed in a static mode. A plurality of interactive information items 650 associated with the blurred version of multimedia content 615 will be displayed in a dynamic mode.

It is to be understood that, in addition to or alternatively to the predetermined interactive operations listed above for switch operations or predetermined operations on interactive information items, the various operations described above may be indicated in other ways. Examples of other methods include, but are not limited to, voice control instructions, triggering of hardware keys, specific gestures in a specific interface (for example, sliding gestures), and so on. The scope of this disclosure is not limited in this respect.

In addition, or alternatively, in some embodiments, the information display interfaces 600A to 600E may also provide more controls or functions. These controls or functions may be hidden, and the hidden controls or functions may be expanded by a certain position in the information display interface 600A to 600E, such as a predetermined operation (for example, click). It is to be understood that the controls or functions shown here are only examples. Different numbers of controls and/or functions may be provided in the information display interfaces 600A to 600E. The scope of this disclosure is not limited in this regard.

It is to be understood that the information display interfaces 600A to 600E in FIGS. 6A to 6E and the interfaces in other figures described below are only example interfaces, and various interface designs may exist in practice. Various graphical elements in an interface may have different arrangements and different visual representations, one or more of them may be omitted or replaced, and one or more other elements may also exist. The scope of this disclosure is not limited in this respect.

By displaying a plurality of interactive information items associated with the blurred version of the multimedia content in a situation mode while the blurred version of the multimedia content is displayed, the user can be provided with interactive perception. For example, the interaction received by the user is played in the form of bullet bubbles, to strengthen the atmosphere of interaction and improve the user's experience of interaction. In addition, by performing a predetermined operation on the interactive information item to present a window that guides the user to shoot or post content, the user can be attracted to post content.

Several examples of presenting clear or blurred multimedia content and associated interactive information items provided by other users to the current user 140 of the application 120 have been described above in conjunction with FIGS. 3 to 6E. In some embodiments, user 140 can view a plurality of interactive information items of other users on the content in a similar way while viewing the content posted by user 140. For example, other users' comments and likes may be displayed in the form of a scrolling pop-up screen.

Figure 7:
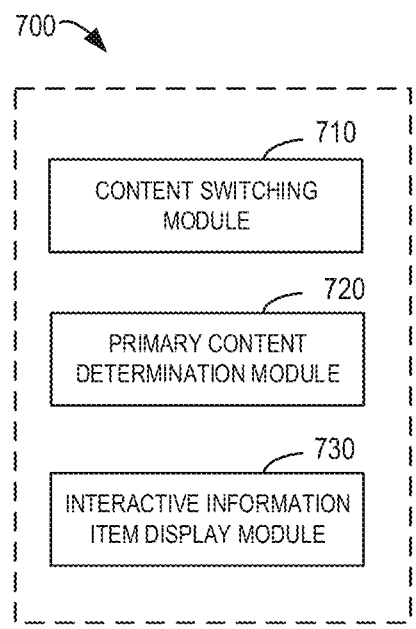
FIG. 7 illustrates a block diagram of an apparatus for information display according to some embodiments of the present disclosure.

FIG. 7 illustrates a block diagram of an apparatus 700 for information display according to some embodiments of the present disclosure. The apparatus 700 may be implemented at or included in the terminal device 110. Various modules/components in the apparatus 700 may be implemented by hardware, software, firmware, or any combination thereof.

As depicted, the apparatus 700 comprises a content switching module 710, configured to in response to receiving a switch operation for switching a first multimedia content currently presented in a user interface to a second multimedia content, perform the switching by reducing a first part of the first multimedia content displayed in the user interface and increasing a second part of the second multimedia content displayed in the user interface. The first and second multimedia contents are clear or blurred.

The apparatus 700 further comprises a primary content determination module 720 configured to in response to no longer detecting the switch operation, determine a primary multimedia content from the first and second multimedia contents at least based on the first and second parts.

In some embodiments, the primary multimedia content is determined based on at least one of the following: a size of the first and/or second parts, a comparison between the first and second parts, and a relative position of an area for displaying the first and/or second multimedia contents in the user interface.

In some embodiments, the first and second multimedia contents are displayed in individual display windows of the user interface.

The apparatus 700 further comprises an interactive information item display module 730 configured to display a plurality of interactive information items associated with the determined primary multimedia content in a dynamic mode.

In some embodiments, the interactive information item display module 730 comprises a first display module configured to present the first interactive content item at a predetermined location for a predetermined period of time. The interactive information item display module 730 may also comprise a second display module configured to in response to an expiration of the predetermined period of time, display a different second interactive content item at the predetermined position for the predetermined period of time.

In some embodiments, the interactive information item display module 730 comprises a prioritizing display module, configured to prioritizing displaying one or more interactive information items comprising a textual content input by a user.

In some embodiments, the interactive information item display module 730 includes an information container display module configured to display a plurality of information containers containing a plurality of interactive information items. The interactive information item display module 730 may further comprises an updating module configured to scroll in a portrait orientation to update the plurality of information containers.

In some embodiments, the interactive information item display module 730 comprises an aligned display module, configured to scrolling displaying the plurality of interactive information items with at least one end being aligned.

In some embodiments, the apparatus 700 further comprises a guidance module configured to present interface elements or pages for guiding users to interact with the interactive information item in response to receiving a predetermined user operation for the interactive information item associated with the first and/or second multimedia contents.

In some embodiments, the apparatus 700 further comprises a static presentation module configured to for a secondary multimedia content of the first and second multimedia contents not determined as the primary multimedia content, display a plurality of interactive information items associated with the secondary multimedia content in a static mode.

In some embodiments, the switch operation is a first operation that occurs in the first orientation. The apparatus 700 may further comprise a second switching module configured to in response to detecting a second operation in a second orientation for the primary multimedia content, display the third multimedia content posted by an author who posts the primary multimedia content as a new primary multimedia content in the user interface. The second orientation is different from the first orientation.

In some embodiments, the apparatus 700 further comprises a ceasing display module, configured to cease displaying multiple interactive information items in a dynamic mode in response to receiving a switch operation for switching the currently presented primary multimedia content to another multimedia content.

In some embodiments, the apparatus 700 further comprises a continuing display module configured to continue displaying the plurality of interactive information items in a dynamic mode in response to receiving a predetermined operation for the primary multimedia content.

Figure 8:
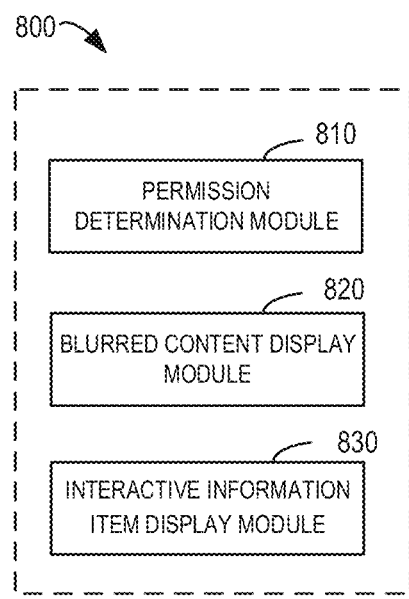
FIG. 8 illustrates a block diagram of another apparatus for information display according to some embodiments of the present disclosure.

FIG. 8 illustrates a block diagram of an apparatus 800 for information display according to some embodiments of the present disclosure. The apparatus 800 may be implemented at or included in the terminal device 110. Various modules/components of the apparatus 800 may be implemented by hardware, software, firmware or any combinations thereof.

As depicted, the apparatus 800 comprises a permission determination module 810, configured to in response to a target multimedia content to be presented to a first user, determine whether the first user has a permission to view a clear version of the target multimedia content.

In some embodiments, the permission determination module 810 is configured to whether the first user has the permission to view the clear version of the target multimedia content based on at least one of the following: the first user posts a multimedia content of a predetermined type within a predetermined period of time, a social relationship between the first user and a second user posting the target multimedia content, settings applied to the target multimedia content by a second user posting the target multimedia content, an account status of the first user in a social application.

The apparatus 800 further comprises a blurred content display module 820 configured to in response to a determination that the first user has no permission to view the clear version of the target multimedia content, display a blurred version of the target multimedia content. The apparatus 800 further comprises an interactive information item display module 830 configured to display an interactive information item associated with the target multimedia content in a clear mode.

In some embodiments, the interactive information item display module 830 comprises a graphical representation display module configured to display a predetermined graphical representation representing the interactive information item. In some embodiments, the graphical representation is an icon specific to a user who posts the interactive information item. In some embodiments, the interactive information item display module 830 may further comprise a number indication display module configured to display an indication of the number of interactive information items.

In addition, or alternatively, in some embodiments, the interactive information item display module 830 includes a textual content display module configured to display one or more interactive information items including textual content input by a user. In some embodiments, the interactive information item display module 830 includes an evaluation information display module configured to display one or more interactive information items including evaluation information input by the user.

In some embodiments, the interactive information item display module 830 comprises a dynamic display module configured to display interactive information items in a dynamic manner.

In some embodiments, the interactive information item display module 830 comprises a first display module configured to present the first interactive content item at a predetermined location for a predetermined period of time. In this embodiment, the interactive information item display module 830 further comprises a second display module, configured to in response to an expiration of the predetermined period of time, display a different second interactive content item at the predetermined position for a predetermined period of time.

In some embodiments, the interactive information item display module 830 may comprise a prioritizing display module, configured to prioritizing display one or more interactive information items comprising a textual content input by a user.

In some embodiments, the apparatus 800 further comprises a guidance interface presentation module, configured to present a user interface for guiding users to record and/or post multimedia content in response to detecting a predetermined operation for an interactive information item associated with the blurred version of the target multimedia content.

In some embodiments, the apparatus 800 further comprises an additional information display module, configured to display at least one of the following while displaying the blurred version of the target multimedia content: a profile picture of a second user posting the target multimedia content, prompt information for guiding a user to record and/or post a multimedia content, and an interface element for interacting with the target multimedia content.

In some embodiments, the apparatus 800 further comprises a clear presentation module configured to display clear target multimedia content in response to determining that the first user has the permission to view a clear version of the target multimedia content. In this embodiment, the apparatus 800 may further comprise a second interactive information item presentation module configured to display interactive information items associated with the target multimedia content in a clear mode.

In some embodiments, the apparatus 800 further comprises an interactive page presentation module, configured to present interface elements or pages for guiding users to interact with interactive information items in response to detecting a predetermined operation on the interactive information items associated with the clear version of the target multimedia content.

Figure 9:
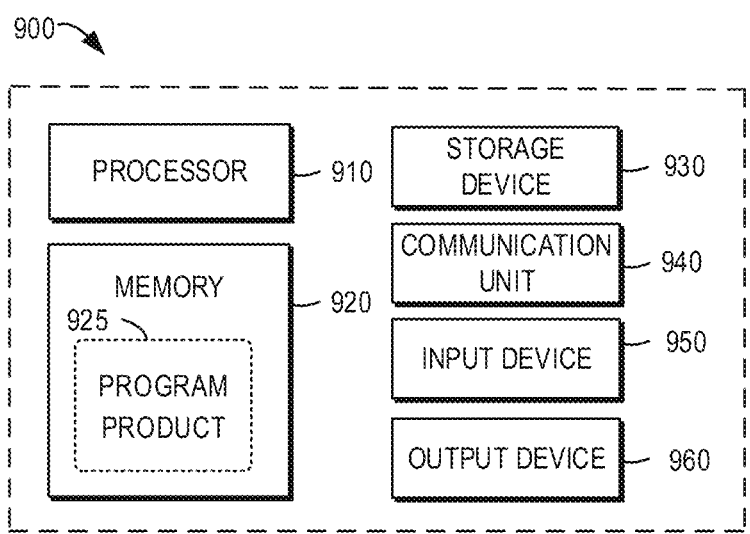
FIG. 9 illustrates an electronic device in which one or more embodiments of the present disclosure can be implemented.

FIG. 9 illustrates a block diagram of an electronic device 900 in which one or more embodiments of the present disclosure can be implemented. It is to be understood that the electronic device 900 as shown in FIG. 9 is merely provided as an example, without suggesting any limitation to the functionalities and scope of embodiments described herein. The electronic device 900 shown in FIG. 9 may be used to implement the terminal device 110 of FIG. 1.

As shown in FIG. 9, the electronic device 900 is in the form of a general-purpose electronic device. Components of the electronic device 900 may include, without limitation to, one or more processors or processing units 910, a memory 920, a storage device 930, one or more communication units 940, one or more input devices 950 as well as one or more output devices 960. The processing unit 910 may be a real or virtual processor and can execute various processing according to programs stored in the memory 920. In a multi-processor system, a plurality of processing units executes in parallel computer-executable instructions to increase the parallel processing capability of the electronic device 900.

The electronic device 900 usually includes various computer storage media. Such media may be any available media accessible by the electronic device 900, including but not limited to, volatile and non-volatile media, or detachable and non-detachable media. The memory 920 may be a volatile memory (for example, a register, cache, Random Access Memory (RAM)), non-volatile memory (for example, a Read-Only Memory (ROM), Electrically Erasable Programmable Read-Only Memory (EEPROM), a flash memory), or any combination thereof. The storage devic930 may be any detachable or non-detachable medium and may include machine-readable medium such as a flash memory drive, a magnetic disk or any other media that can be used for storing information and/or data (e.g., training data for training) and are accessible within the electronic device 900.

The electronic device 900 may further include additional detachable/non-detachable, volatile/non-volatile memory media. Although not shown in FIG. 9, there may be provided a disk drive for reading from or writing into a detachable and non-volatile disk (e.g., a floppy disk), and an optical disk drive for reading from and writing into a detachable non-volatile optical disk. In such cases, each drive may be connected to a bus (not shown) via one or more data medium interfaces. The memory 920 may include a computer program product 925 having one or more program modules which are configured to perform various methods or acts according to various embodiments of the present disclosure.

The communication unit 940 implements communication with another computing device via the communication medium. In addition, the functionalities of components in the electronic device 900 may be implemented by a single computing cluster or a plurality of computing machines that can communicate with each other via communication connections. Thus, the electronic device 900 may operate in a networked environment using a logic connection with one or more other servers, network personal computers (PCs), or further general network nodes.

The input device 950 may include one or more of a variety of input devices, such as a mouse, keyboard, trackball and the like. The output device 960 may be one or more output devices, such as a display, loudspeaker, printer and the like. By means of the communication unit 940, the electronic device 900 may further communicate with one or more external devices (not shown) such as storage devices and display devices, one or more devices that enable the user to interact with the electronic device 900, or any devices (such as a network card, a modem and the like) that enable the electronic device 900 to communicate with one or more other computing devices, if required. Such communication may be performed via input/output (I/O) interfaces (not shown).

The electronic device 900 may further be provided with cameras. The cameras may communicate with other components of the electronic device 900 or with an external device via the communication unit 940.

According to example implementations of the present disclosure, there is provided a computer-readable storage medium with computer-executable instructions stored thereon, wherein the computer-executable instructions are executed by a processor to realize the methods described above. According to example implementations of the present disclosure, there is further provided there is provided a computer program product tangibly stored on a non-transient computer-readable medium and comprising computer-executable instructions which are executed by a processor to realize the methods described above.

Aspects of the present disclosure are described herein with reference to flowchart illustrations and/or block diagrams of methods, apparatus (systems), and computer program products according to implementations of the present disclosure. It will be understood that each block of the flowchart illustrations and/or block diagrams, and combinations of blocks in the flowchart illustrations and/or block diagrams, can be implemented by computer-readable program instructions.

These computer readable program instructions may be provided to a processing unit of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It is also to be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

We claim:

1. A method for information display, comprising:
   in response to a target multimedia content to be presented to a first user, determining whether the first user has a permission to view a clear version of the target multimedia content;
   in response to a determination that the first user has no permission to view the clear version of the target multimedia content,
      displaying a blurred version of the target multimedia content to the first user; and
      displaying at least one interactive information item associated with the target multimedia content in a clear mode to the first user,
   wherein the at least one interactive information item is associated with a further user different from the first user, and
   wherein the at least one interactive information item at least comprises an interactive information item including evaluation information for the target multimedia content input by the further user.

2. The method according to claim 1, further comprising:
   in response to detecting a predetermined operation for the interactive information item associated with the blurred version of the target multimedia content, presenting a user interface for guiding a user to record and/or post a multimedia content.

3. The method according to claim 1, further comprising:
   while displaying the blurred version of the target multimedia content, displaying at least one of the following:
      a profile picture of a second user posting the target multimedia content,
      prompt information for guiding a user to record and/or post a multimedia content,
      an interface element for interacting with the target multimedia content.

4. The method according to claim 1, wherein displaying at least one interactive information item associated with the target multimedia content in a clear mode comprises at least one of the following:
   displaying a predetermined graphical representation representing the at least one interactive information item;
   displaying an indication of a number of interactive information items;
   displaying one or more interactive information items comprising a textual content input by a user different from the first user;
   displaying one or more interactive information items comprising evaluation information input by a user different from the first user.

5. The method according to claim 4, wherein the predetermined graphical representation is an icon specific to a user posting the interactive information item.

6. The method according to claim 1, wherein determining whether the first user has the permission to view the clear version of the target multimedia content comprises:
   determining whether the first user has the permission to view the clear version of the target multimedia content based on at least one of the following:
      the first user posts a multimedia content of a predetermined type within a predetermined period of time,
      a social relationship between a second user posting the target multimedia content and the first user,
      settings applied to the target multimedia content by a second user posting the target multimedia content,
      an account status of the first user in a social application.

7. The method according to claim 1, further comprising:
   in response to a determination that the first user has the permission to view the clear version of the target multimedia content,
      displaying the clear target multimedia content to the first user; and
      displaying an interactive information item associated with the target multimedia content in a clear mode to the first user.

8. The method according to claim 7, further comprising:
   in response to detecting a predetermined operation on the interactive information item associated with the clear version of the target multimedia content, presenting an interface element or page for guiding a user to interact with the interactive information item.

9. The method according to claim 1, wherein displaying at least one interactive information item associated with the target multimedia content in a clear mode comprises:
    displaying interactive information items dynamically.

10. The method according to claim 9, wherein displaying at least one interactive information item associated with the target multimedia content in a clear mode comprises:
    displaying a first interactive information item at a predetermined position for a predetermined period of time; and
    in response to an expiration of the predetermined period of time, displaying a different second interactive information item at the predetermined position for a predetermined period of time.

11. The method according to claim 1, wherein displaying at least one interactive information item associated with the target multimedia content in a clear mode comprises:
    prioritizing displaying one or more interactive information items comprising a textual content input by a user.

12. An electronic device, comprising:
    at least one processing unit; and
    at least one memory, coupled to the at least one processing unit and storing instructions to be executed by the at least one processing unit, the instructions, when executed by the at least one processing unit, causing the electronic device to:
    in response to a target multimedia content to be presented to a first user, determine whether the first user has a permission to view a clear version of the target multimedia content;
    in response to a determination that the first user has no permission to view the clear version of the target multimedia content,
        display a blurred version of the target multimedia content to the first user; and
        display at least one interactive information item associated with the target multimedia content in a clear mode to the first user,
    wherein the at least one interactive information item is associated with a further user different from the first user, and
    wherein the at least one interactive information item at least comprises an interactive information item including evaluation information for the target multimedia content input by the further user.

* * * * *